Figure 1:
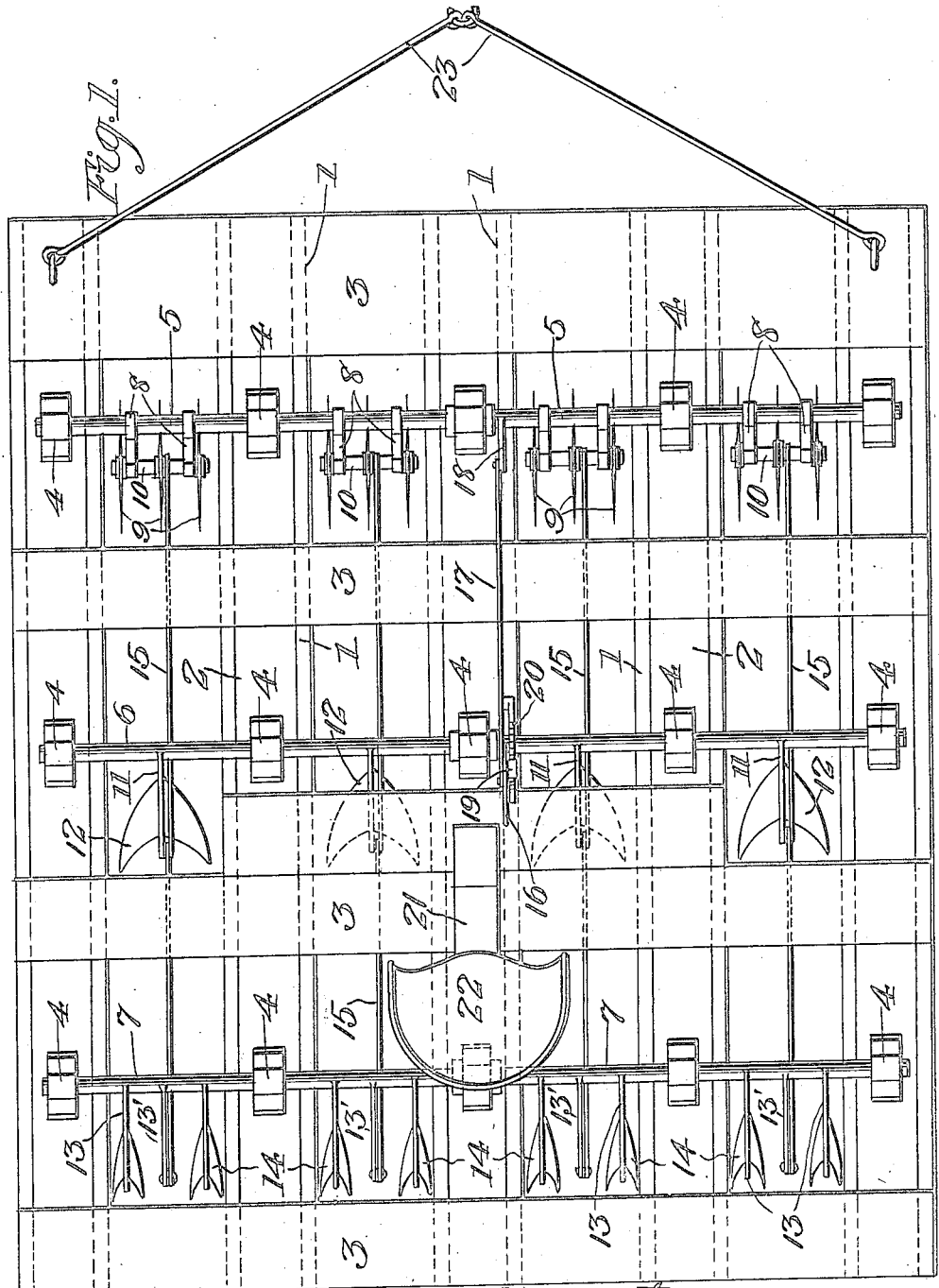

Feb. 27, 1923.

S. G. WICKS

COTTON BLOCKING MACHINE

Filed Nov. 10, 1921

1,446,530

2 sheets-sheet 1

Inventor;
Samuel G. Wicks,
by Chas. J. O'Neill, atty.

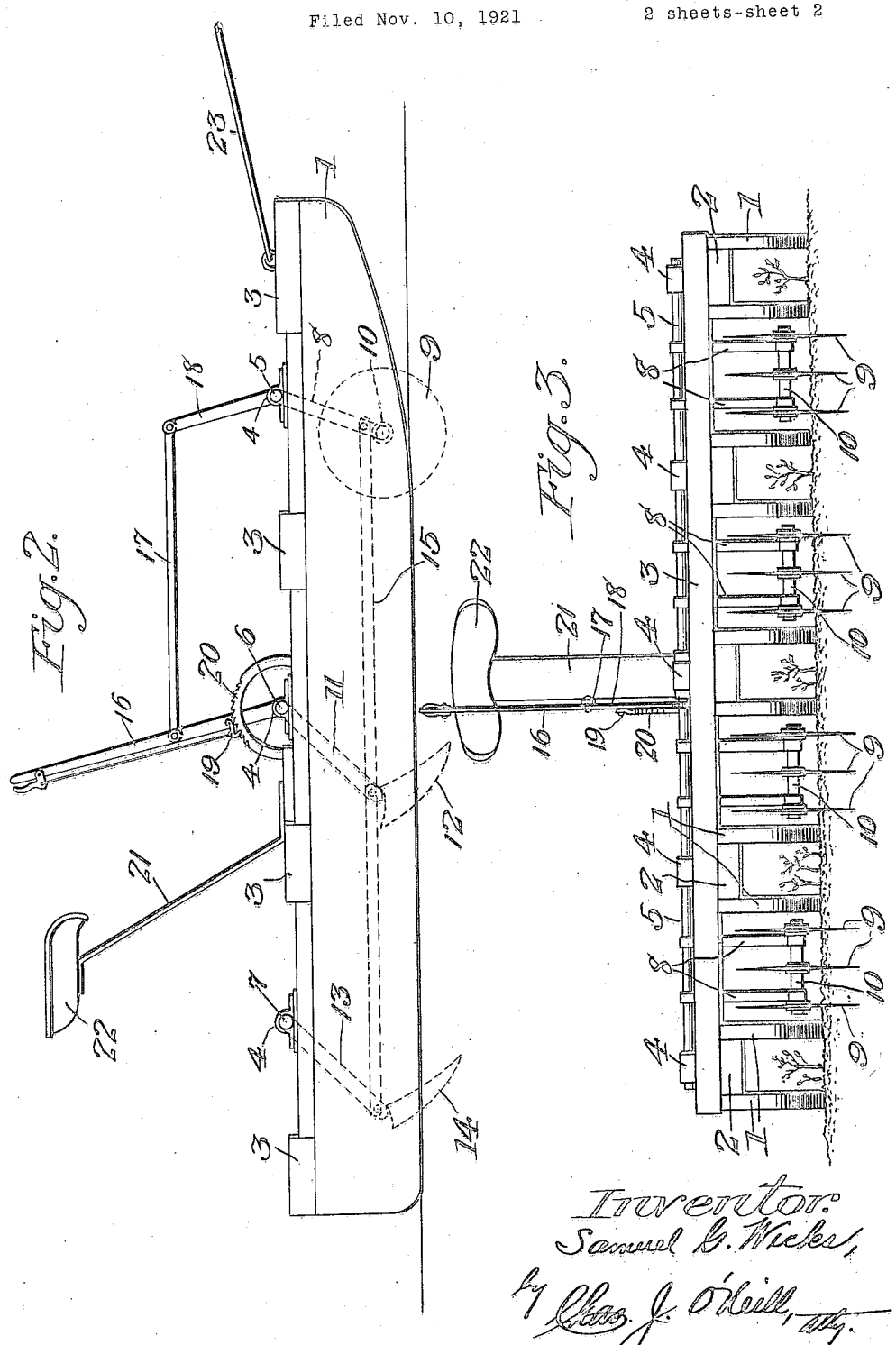

Patented Feb. 27, 1923.

1,446,530

UNITED STATES PATENT OFFICE.

SAMUEL GEORGE WICKS, OF BOBO, MISSISSIPPI.

COTTON-BLOCKING MACHINE.

Application filed November 10, 1921. Serial No. 514,255.

*To all whom it may concern:*

Be it known that I, SAMUEL GEORGE WICKS, a citizen of the United States, residing at Bobo, in the county of Coahoma and State of Mississippi, have invented certain new and useful Improvements in Cotton-Blocking Machines; and I do hereby declare the following to be a full, clear, and exact description of the invention, such as will enable others skilled in the art to which it appertains to make and use the same.

This invention relates to certain improvements in agricultural implements, and particularly to a cotton blocking or chopping machine, and has for its principal object the provision of a device whereby the undesirable and excess cotton plants, vines, weeds, grass and the like, can be removed in order to enhance and stimulate the growth of the remaining plants, and at the same time obtain a layout of uniformly and regularly checked hills to subsequently permit the proper cultivating and working of the crop.

The device is intended to be drawn across the field in a direction at right angles to the direction of the planted rows of cotton, and as distinguished from similar implements mounted on wheels, in the present invention runners are provided, resting upon the ground and being of ample length to extend across at least two rows of plants at the same time, and thereby preserve the level of the machine during its operation. This is an advantage over machines mounted upon wheels, for, when so mounted, said machine moves forward in ups and downs and with a jerky motion incident to moving over uneven ground, whereas, in the present instance, the machine, being mounted on runners or slides, covers transversely two rows of cotton plants at a time and consequently preserves the desired level. Furthermore, the particular arrangement of discs and plows results in certain other advantages to be hereinafter more fully disclosed.

To accomplish this and other objects that will be apparent later, the device constituting the present invention, briefly stated, comprises a series of runners placed in pairs, the runners of each pair being spaced preferably about eight inches apart and having their top edges connected by suitable cross members, the whole providing the main supporting frame of the machine.

In the preferred construction the runners are of a length, and sufficient in number, to provide a device approximately six feet square, and extending across said runners intermediate the cross members above referred to, are three transverse shafts placed parallel to each other and mounted in suitable bearings to permit an oscillatory moveable movement thereof, as desired, during the operation of the machine. On the forward transverse shaft, between each pair of runners, are mounted three rolling discs, the purpose of which being to cut up all excess cotton plants, trash, vines, grass, weeds and the like, and to also cut and pulverize the hard ground. Each series of these discs is followed by a shovel plow, mounted on the intermediate shaft for thinning out the cotton plants and the third or rear shaft is provided with additional smaller plows in pairs between each pair of runners, following in offset relation the single plows mounted on the intermediate shaft which throw the loosened ground in opposite directions to the young plants.

The runners above referred to, not only provide a support for the machine, but, in addition, furnish a shield or fender for preventing the dirt, as it is thrown by the plows, from covering up the young plants being worked, it being borne in mind, that the plants which are preserved pass between these runners, said runners being sufficiently long to prevent at all times the clods and excess dirt from covering up these plants during the operation of the machine.

From the foregoing it will be noted that there are four sets of rolling discs, three to each space between the pairs of runners, and plows arranged in tandem following these discs. The first row of plows are to be adjusted to run a given depth, and the second row are fixed to run a little deeper in the ground than the first, means being provided for raising and lowering the discs and plows operated from a convenient position on top of the machine.

With the above arrangement the ground can be more thoroughly pulverized than would be possible with a single set of plows, and the amount of ground thrown by any one plow will not be sufficient to be heaped up against the fender in any considerable quantity at any one point, and, therefore, there is no hill of dirt left to fall back upon the plants after the machine has passed, and in addition the field is properly and completed check rowed.

The preferred construction of the invention is illustrated in the accompanying drawings, in which:

Fig. 1 is a plan view of the machine;
Fig. 2 is a side elevation and;
Fig. 3 is a forward view thereof.

Referring to the drawings in detail, the main supporting structure of the device comprises a drag or sled consisting of a series of parallel runners 1 having their upper edges connected by an intermediate strip 2, each pair of runners forming substantially an inverted trough.

These various pairs of runners so constructed are arranged parallel to each other, being spaced the proper distance apart and connected by a series of transverse members 3, the whole forming a sled or drag, preferably about six feet square, which has been found to be most suitable to accomplish the results desired, the distance between each pair of runners being somewhat greater than the distance between the runners of each pair.

Also arranged transversely of the drag and mounted on the top thereof in suitable bearings 4 are preferably three shafts 5, 6 and 7. Depending downwardly from the forward shaft 5, between each pair of runners 1, are brackets or the like 8, each bracket supporting a series of cutting rolling discs 9 mounted upon a suitable shaft 10, the various brackets 8 being rigidly secured to the shaft 5.

Rigidly secured to the intermediate shaft 6 are a series of downwardly depending arms 11, each arm carrying a shovel plow 12, said plow being located directly following the rolling cutter discs 9. The rear shaft 7 is likewise provided with a series of rigid arms 13, also extending downwardly between each pair of runners, but in this arrangement two arms are provided between each pair of runners, each of said arms carrying a smaller plow 14 following the plow 12, but disposed a little to each side of said plow 12.

The shafts 5, 6 and 7 supporting the various discs and plows are adapted to be oscillated in unison to raise and lower said discs and plows during the operation of the device, and to accomplish this a series of longitudinal rods or bars 15 are provided connecting the downwardly extending arms 8 and 11 of the discs 9 and plows 12, the rear ends of said rods 15 being connected to auxiliary downwardly extending arms 13' secured to the shaft 7, these auxiliary arms being necessary owing to the fact that the plows 14 are offset from the plows 12, making it impossible to connect said rods 15 to the arms 13 supporting the plows 14, as is the case with the intermediate plows 12. These plows are raised and lowered in unison by a lever 16 connected by a link 17 to an upstanding arm 18 secured to the forward shaft 5, through which mechanism a throw of the lever one way or the other will cause an oscillation of the shafts 5, 6 and 7, which, in turn, imparts the necessary movement to the discs 9 and plows 12 and 14. To maintain these various parts in any desired adjusted position, the lever arm 16 is provided with a conventional type of pawl 19 engaging a rachet segment 20. Mounted adjacent this operating mechanism, and particularly the lever 16, is a support 21 carrying a seat 22 to accommodate the operator during the use of the apparatus, the forward end of the device being provided with any desired towing connection 23 by which the same is drawn across the field in the manner hereinbefore specified. It will be noted that the intermediate plows 12 are preferably shovel plows and centrally disposed between the different series of runners, whereas the rear plows 14 are much smaller and mounted close to the sides of the runners 1. The function of the shovel plows is primarily to cut under the various undesirable plants and weeds, whereas the smaller plows 14, in addition to completing this operation, throw the dirt to the remaining plants, the runners preventing said dirt from covering said plants during this operation.

As hereinbefore stated, this apparatus is of the drag type, and adapted to be drawn across the rows of cotton plants or the like, and in the preferred and practical construction thereof the runners are preferably six feet long and eight inches high, leaving a five inch space for the cotton to run through, and an eight inch space for the plows and cutters, a required number of pairs of runners being provided to make the machine approximately six feet wide, the length and width thereof making it possible to span a sufficient area, both longitudinally and transversely, to maintain said machine substantially level, irrespective, within certain limits, of the uneven condition of the ground.

Although the invention has been described in connection with the working of cotton crops, it is to be understood that said machine can obviously be used in working various other crops of a similar nature.

What I claim is:

1. In a cotton blocking machine, the combination with a drag or sled, of a series of runners for said drag arranged in pairs, a series of parallel shafts transversely mounted upon said runners and discs and plows supported upon said shafts successively positioned between each pair of runners.

2. In a cotton blocking machine, the combination with a drag or sled, of a series of runners for said drag arranged in pairs, transverse members for connecting said runners in spaced, parallel relation, a series of parallel shafts transversely mounted upon said runners intermediate the aforesaid transverse members, and disc and plows supported upon said shafts successively positioned between each pair of runners.

3. In a cotton blocking machine, the combination with a drag or sled, of a series of runners for said drag arranged in pairs, transverse members for connecting said runners in spaced, parallel relation, a series of parallel shafts transversely mounted upon said runners intermediate the aforesaid transverse members and disc and plows supported upon said shafts successively positioned between each pair of runners, the space between the pair of runners being greater than the space between the runners of each pair.

4. In a cotton blocking machine, the combination with a drag or sled, of a series of runners for said drag arranged in pairs, transverse members for connecting each pair of runners in spaced parallel relation, a series of parallel shafts also mounted on said drag transversely of said runners intermediate the aforesaid transverse members and discs and plows supported upon said shafts in position to extend downwardly between the pairs of runners.

5. In a cotton blocking machine, the combination with a drag or sled, of a series of runners for said drag arranged in pairs, transverse members for connecting each pair of runners in spaced, parallel relation, forming a rigid unitary structure, a series of parallel shafts, also mounted on said drag transversely of said runners, intermediate the aforesaid transverse members, discs and plows supported upon said shafts in position to extend downwardly between the pairs of runners, and means for raising and lowering said discs and plows.

6. In a cotton blocking machine, the combination with a drag or sled, of a series of runners for said drag arranged in pairs, transverse members for connecting each pair of runners in spaced parallel relation, a series of shafts also mounted on the drag transversely of said runners, discs mounted on the forward shaft, plows mounted on the remaining shafts and all of said discs and plows being in a position to extend downwardly between the pairs of runners and means for raising and lowering said discs and plows.

7. In a cotton blocking machine, the combination with a drag or sled, of a series of runners for said drag arranged in pairs, transverse members for connecting each pair of runners in spaced parallel relation, a series of three shafts also mounted on the drag transversely of said runners, a series of discs mounted on the forward shaft between each pair of runners, a large single plow following said discs mounted between each pair of runners on the intermediate shaft, a pair of smaller plows, following each of the larger plows also mounted between each pair of runners, carried by the remaining shaft and means operable from the top of the drag for raising and lowering said discs and plows.

In testimony whereof I affix my signature.

SAMUEL GEORGE $\overset{\text{his}}{\times}$ WICKS.
mark

Witnesses:
C. V. MOORE,
J. W. HENDERSON.